United States Patent
Evans et al.

(10) Patent No.: US 9,525,665 B1
(45) Date of Patent: Dec. 20, 2016

(54) SYSTEMS AND METHODS FOR OBSCURING NETWORK SERVICES

(71) Applicant: Symantec Corporation, Mountain View, CA (US)

(72) Inventors: Nathan Evans, Sterling, VA (US); Azzedine Benameur, Fairfax Station, VA (US); Matthew Elder, Germantown, MD (US)

(73) Assignee: Symantec Corporation, Mountain View, CA (US)

( * ) Notice: Subject to any disclaimer, the term of this patent is extended or adjusted under 35 U.S.C. 154(b) by 264 days.

(21) Appl. No.: 14/210,399

(22) Filed: Mar. 13, 2014

(51) Int. Cl.
*H04L 29/06* (2006.01)

(52) U.S. Cl.
CPC .................................. *H04L 63/0281* (2013.01)

(58) Field of Classification Search
None
See application file for complete search history.

(56) References Cited

U.S. PATENT DOCUMENTS 6,986,036 B2 * 1/2006 Wang .................. G06Q 20/3821
713/153

2008/0123852 A1 * 5/2008 Jiang ...................... H04W 12/06
380/273
2013/0298218 A1 * 11/2013 Rash ...................... G06F 21/552
726/11

OTHER PUBLICATIONS

Smits et al., BridgeSPA: Improving Tor Bridges with Single Packet Authorization, Oct. 2011, WPES'11.*

(Continued)

*Primary Examiner* — Saleh Najjar
*Assistant Examiner* — Louis Teng
(74) *Attorney, Agent, or Firm* — FisherBroyles LLC

(57) ABSTRACT

A computer-implemented method for obscuring network services may include (1) identifying a local network comprising at least one client and at least one host, where the host provides a service that is not bound to any routable address on the local network and the client is expected to send messages to the service, (2) provisioning the client with a proxy that intercepts the messages directed to the service by the client, identifies the host that provides the service, and adds at least one layer of encryption to the messages, (3) configuring the proxy to route the messages through an onion routing network within the local network that comprises at least one onion routing node, and (4) configuring the onion routing network to remove the at least one layer of encryption from the messages before forwarding the messages. Various other methods, systems, and computer-readable media are also disclosed.

20 Claims, 7 Drawing Sheets

(56) References Cited

OTHER PUBLICATIONS

R. Dingledine, N. Mathewson, and P. Syverson. Tor: The Second-Generation Onion Router. In in Proceedings of the 13th Usenix Security Symposium, 2004.*

Reynolds et al., RFC 1700: Assigned Numbers, Oct. 1994, Network Working Group.*

Patil et al., Anonymous Connections and Onion Routing, 2012, International Journal of Advanced Research in Computer Science and Software Engineering, vol. 2, Issue 2.*

Guruprasad, Who needs addresses?, 2000, IEEE.*

Network World Security, "Onion routing", http://www.networkworld.com/details/7088.html, as accessed Jan. 30, 2014, Network World, Inc., (1994).

Jeremy, Kirk, "Researchers peel the Onion Router", http://www.infoworld.com/d/networking/researchers-peel-onion-router-790, as accessed Jan. 30, 2014, InfoWorld, Inc., (Mar. 2, 2007).

Lambert, Patrick, "Freedom Hosting and 'torsploit': Troubles on the Onion router", http://www.techrepublic.com/blog/it-security/freedom-hosting-and-torsploit-troubles-on-the-onion-router/, as accessed Jan. 30, 2014, CBS Interactive, (Aug. 8, 2013).

* cited by examiner

SYSTEMS AND METHODS FOR OBSCURING NETWORK SERVICES

BACKGROUND

A malicious actor who gains access to an organization's file server, mail server or database server is capable of causing severe damage to the organization. In order to gain access to one of the above services, an attacker may first gain access to the network and then determine which machine within the network is hosting the service. One common way of determining the host of a service after gaining access to a network is monitoring traffic on the network and observing which traffic is routed to which host as well as which ports the traffic is routed through.

Traditional systems for securing networks often focus on preventing attackers from gaining access to the network, but may have no process for mitigating an attack once it has progressed past that stage. Some traditional systems may revolve around preventing data exfiltration once critical servers have been accessed. In some examples, traditional systems may be focused on detecting network intrusions by potentially malicious actors. Traditional systems for securing networks may not include any measures for preventing attackers from identifying which hosts provide which services on a network. Accordingly, the instant disclosure identifies and addresses a need for additional and improved systems and methods for obscuring network services.

SUMMARY

As will be described in greater detail below, the instant disclosure generally relates to systems and methods for obscuring network services by routing network traffic through a series of identical hosts configured to function as an onion routing network.

In one example, a computer-implemented method for configuring local networks to obscure network traffic may include (1) identifying a local network including at least one client and at least one host, where the host provides a service that is not bound to any routable address on the local network and the client is expected to send messages to the service, (2) provisioning the client with a proxy that intercepts the messages directed to the service by the client, identifies the host that provides the service based on determining that the messages are directed to the service, and adds at least one layer of encryption to the messages, (3) configuring the proxy to route the messages from the proxy to the host through an onion routing network within the local network that includes at least one onion routing node, and (4) configuring the onion routing network to remove the at least one layer of encryption from the messages before forwarding the messages toward the host via the local network.

In one embodiment, the proxy may determine that the messages are directed to the service based on a token attached to the messages that identifies the service and the location of the host. In some examples, the computer-implemented method may further include providing the token that identifies the service to the client via an out-of-band process.

In some embodiments, traffic to the network and/or the host may be routed through a single port to further obscure services. In some examples, the computer-implemented method may further include configuring the service provided by the host to not be bound to any routable address on the local network. Additionally or alternatively, the computer-implemented method may further include configuring the local network to expose a single port that is bound to an additional proxy that routes to a plurality of services. In some examples, the computer-implemented method may further include configuring the proxy to redirect the messages from the client from an application port to an additional proxy.

In some embodiments, multiple servers may all act as both hosts and proxies. For example, the proxy may include a plurality of proxies provisioned to a plurality of hosts. In some examples, the computer-implemented method may further include configuring the host to function as an additional proxy that routes additional messages from at least one additional host. In one example, the computer-implemented method may further include configuring the host to not provide information that differentiates the host from at least one additional host on the local network that in response to a network scan.

The service provided by the host may be of a variety of types. In one embodiment, the service may include (1) a mail service, (2) a file service, and/or (3) a database service.

In some examples, the computer-implemented method may further include configuring the onion routing network to route messages from the client to the host via a plurality of sets of onion routing nodes that are selected from the onion routing network each session. In one example, the onion routing network may remove the at least one layer of encryption from the messages by removing a single layer of encryption at each onion routing node.

In one embodiment, a system for implementing the above-described method may include (1) an identification module, stored in memory, that identifies a local network including at least one client and at least one host, where the host provides a service that is not bound to any routable address on the local network and the client is expected to send messages to the service, (2) a provisioning module, stored in memory, that provisions the client with a proxy that intercepts the messages directed to the service by the client, identifies the host that provides the service based on determining that the messages are directed to the service, and adds at least one layer of encryption to the messages, (3) a proxy configuration module, stored in memory, that configures the proxy to route the messages from the proxy to the host through an onion routing network within the local network that may include at least one onion routing node, (4) a routing configuration module, stored in memory, that configures the onion routing network to remove the at least one layer of encryption from the messages before forwarding the messages toward the host via the local network, and (5) at least one physical processor configured to execute the identification module, the provisioning module, the proxy configuration module, and the routing configuration module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a local network including at least one client and at least one host, where the host provides a service that is not bound to any routable address on the local network and the client is expected to send messages to the service, (2) provision the client with a proxy that intercepts the messages directed to the service by the client, identifies the host that provides the service based on determining that the messages are directed to the service, and adds at least one layer of encryption to the messages, (3) configure the proxy to route the messages from the proxy to the host through an onion routing network within the local network that includes at least one onion routing node, and (4) configure the onion routing network to remove the at least one layer of encryption from the messages before forwarding the messages toward the host via the local network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
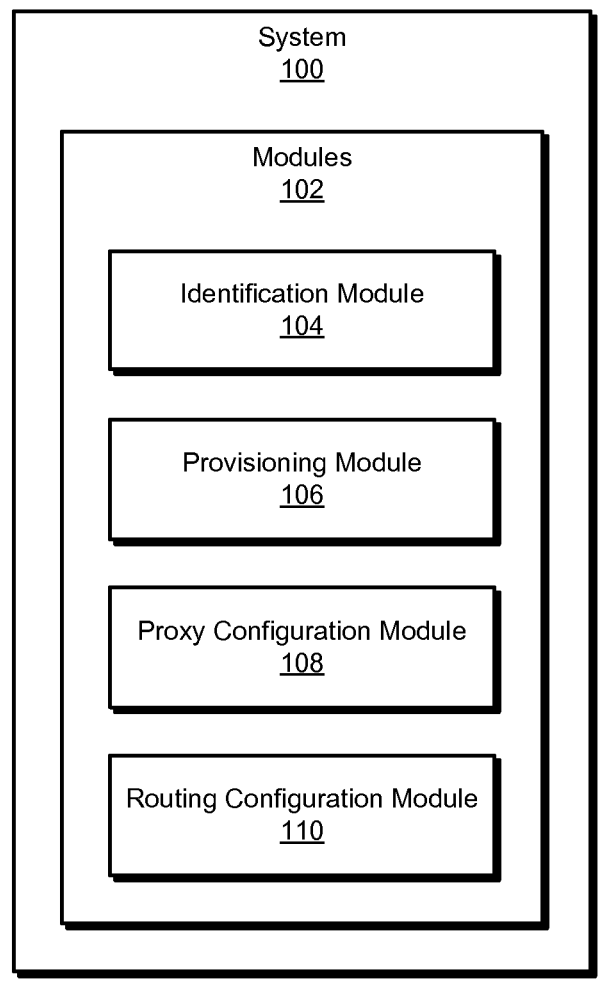
FIG. 1 is a block diagram of an exemplary system for obscuring network services.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for obscuring network services. As will be explained in greater detail below, by configuring a local network to host services on identical hosts and route all traffic to the services via a network of onion routers, systems described herein may obscure network services from potential attackers. By making it more difficult for attackers to determine which server hosts which service, systems described herein may increase the difficulty of attacking those services.

The following will provide, with reference to FIGS. 1, 2, 4, and 5, detailed descriptions of exemplary systems for obscuring network services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for configuring local networks to obscure network traffic. As illustrated in this figure, exemplary system 100 may include one or more modules 102 for performing one or more tasks. For example, and as will be explained in greater detail below, exemplary system 100 may include an identification module 104 that may identify a local network including at least one client and at least one host, where the host provides a service that may be not bound to any routable address on the local network and the client may be expected to send messages to the service. Exemplary system 100 may additionally include a provisioning module 106 that may provision the client with a proxy that intercepts the messages directed to the service by the client, identifies the host that provides the service based on determining that the messages are directed to the service, and adds at least one layer of encryption to the messages.

Exemplary system 100 may also include a proxy configuration module 108 that may configure the proxy to route the messages from the proxy to the host through an onion routing network within the local network that may include at least one onion routing node. Exemplary system 100 may additionally include a routing configuration module 110 that may configure the onion routing network to remove the at least one layer of encryption from the messages before forwarding the messages toward the host via the local network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or host 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
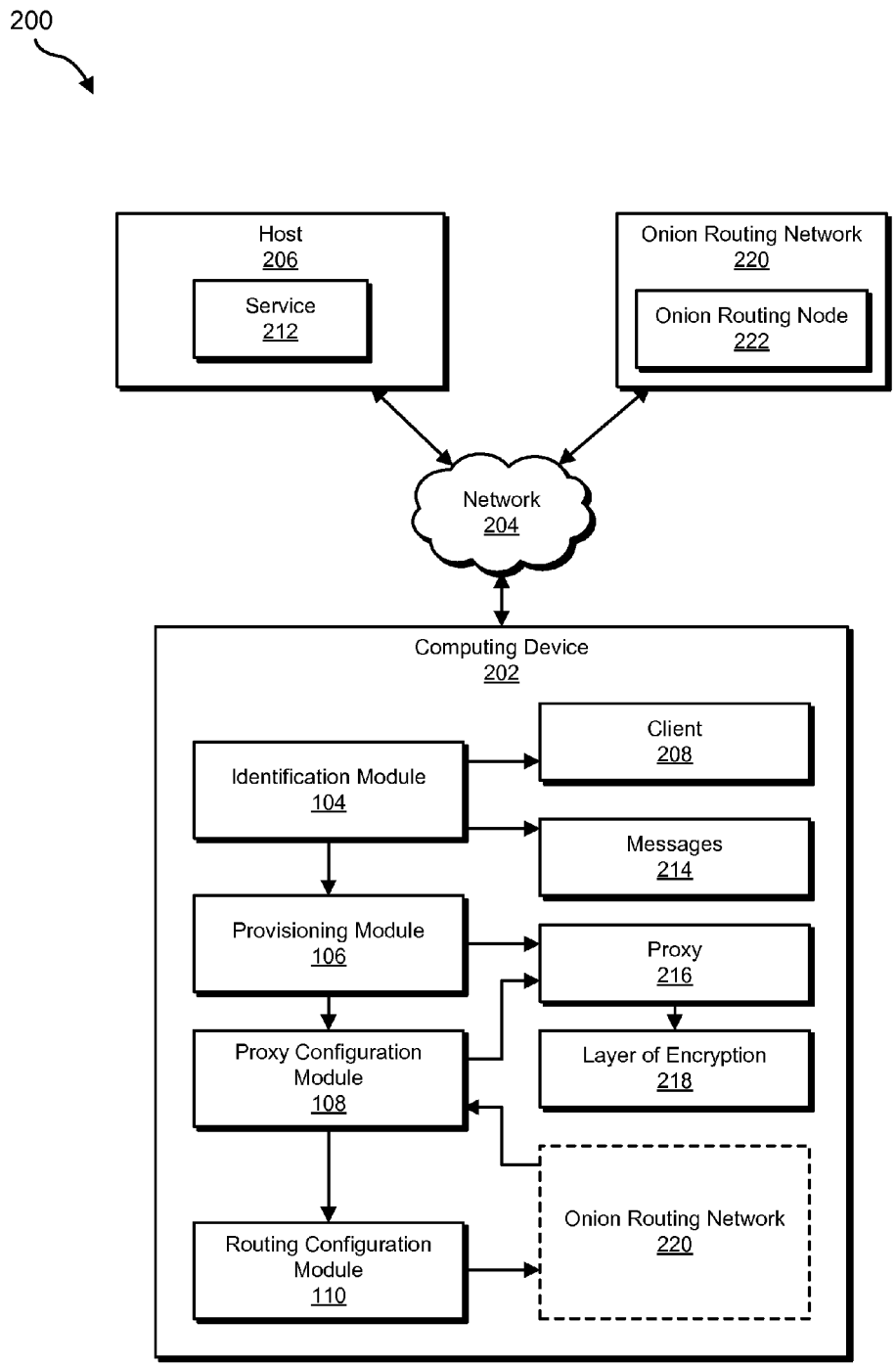
FIG. 2 is a block diagram of an additional exemplary system for obscuring network services.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a host 206 and/or an onion routing network 220 via a network 204. In one example, computing device 202 may be programmed with one or more of modules 102. Additionally or alternatively, host 206 may be programmed with one or more of modules 102.

In one embodiment, one or more of modules 102 from FIG. 1 may, when executed by at least one processor of computing device 202 and/or host 206, enable computing device 202 and/or host 206 to obscure network services. For example, and as will be described in greater detail below, one or more of modules 102 may cause computing device 202 and/or host 206 to obscure network services. For example, and as will be described in greater detail below, identification module 104 may identify a local network 204 including at least one client 208 and at least one host 206, where host 206 provides a service 212 that is not bound to any routable address on local network 204 and client 208 is expected to send messages 214 to service 212. Next, provisioning module 106 may provision client 208 with a proxy 216 that intercepts messages 214 directed to service 212 by client 208, identifies host 206 that provides service 212 based on determining that messages 214 are directed to service 212, and adds at least one layer of encryption 218 to messages 214. Once host 206 has been provisioned with proxy 216, proxy configuration module 108 may configure proxy 216 to route messages 214 from proxy 216 to host 206 through an onion routing network 220 within local network 204 that may include at least one onion routing node 222. Finally, routing configuration module 110 may configure onion routing network 220 to remove the at least one layer of encryption 218 from messages 214 before forwarding messages 214 toward host 206 via local network 204.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Host 206 generally represents any type or form of computing device that is capable of providing a service. Examples of host 206 include, without limitation, application servers and database servers configured to provide various database services and/or run certain software applications.

Network 204 generally represents any medium or architecture capable of facilitating communication or data transfer. Examples of network 204 include, without limitation, an intranet, a Local Area Network (LAN), a Personal Area Network (PAN), exemplary network architecture 700 in FIG. 7, or the like. Network 204 may facilitate communication or data transfer using wireless or wired connections. In one embodiment, network 204 may facilitate communication between computing device 202 and host 206.

Figure 3:
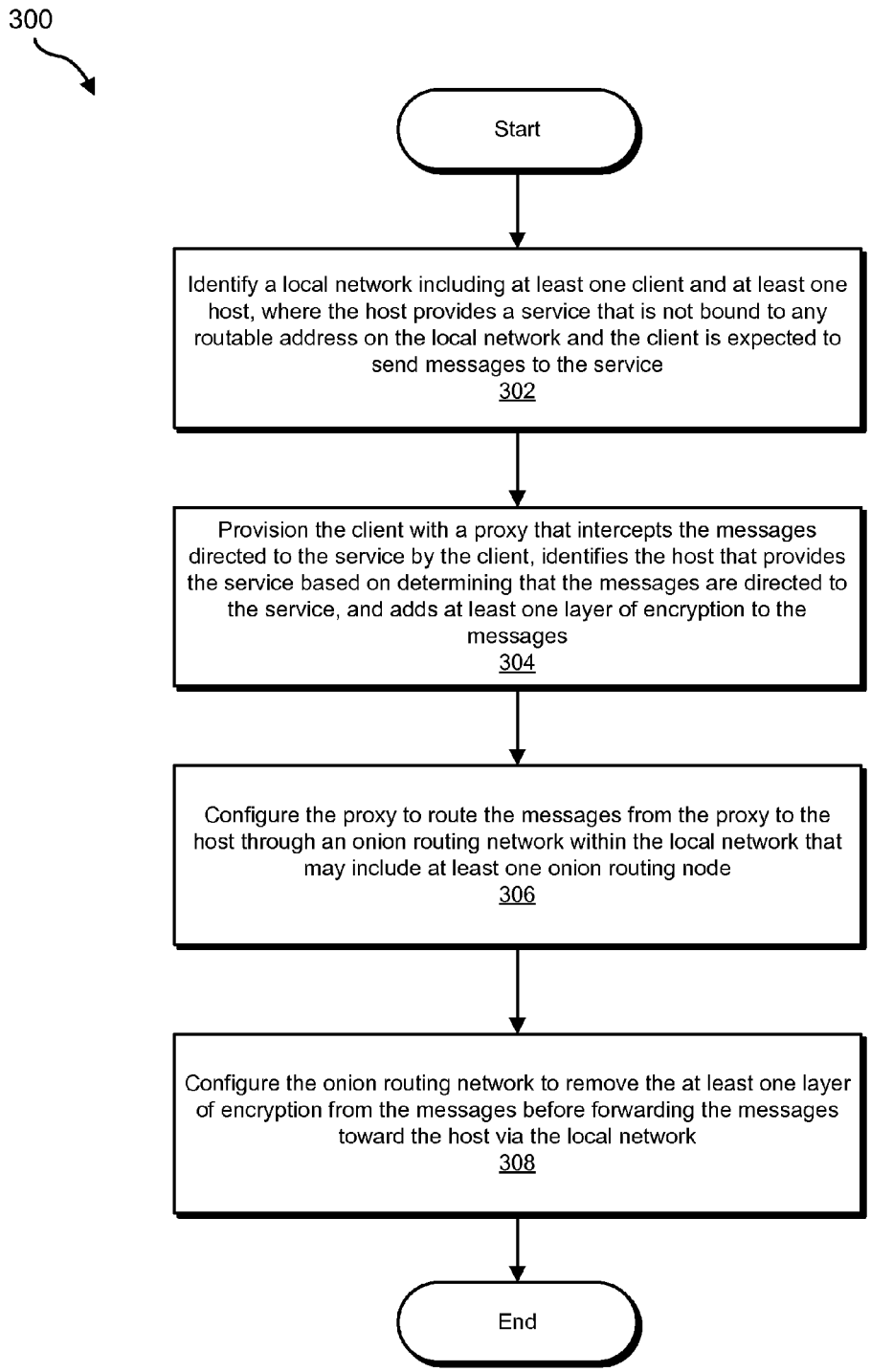
FIG. 3 is a flow diagram of an exemplary method for obscuring network services.

FIG. 3 is a flow diagram of an exemplary computer-implemented method 300 for obscuring network services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a local network including at least one client and at least one host, where the host provides a service that is not bound to any routable address on the local network and the client is expected to send messages to the service. For example, at step 302 identification module 104 may, as part of computing device 202 in FIG. 2, identify local network 204 including at least one client 208 and at least one host 206, where host 206 provides a service 212 that is not bound to any routable address on the local network 204 and client 208 is expected to send messages 214 to service 212.

The term "service," as used herein, generally refers to any function that may be provided by a host system to one or more client systems. A service may run at the application layer and/or at the network application layer. In some examples, a service may include a mail service, a file service, a network service, and/or a database service.

The phrase "local network," as used herein, generally refers to any medium or architecture capable of facilitating communication or data transfer. In some embodiments, a local network may be a private network used by an organization to host services. In some examples, a local network may be hosted on machines in physical proximity in a data center. In some examples, the client systems may be located in the same data center as the local network. Additionally or alternatively, the client systems may be located in a different location from the local network. In these examples, the network may still provide services exclusively to specific clients but may not be physically located near the clients. In some examples, a local network may be connected to a wide area network such as the Internet and/or may be exposed to attacks from the wide area network. In some embodiments, a local network may provide services to clients on only one side of a network gateway.

The term "client," as used herein, generally refers to any computing system that may communicate with services. In some embodiments, a client may be an application on a computing device. For example, a client may include an email application that may request services from a mail server. In another example, a client may include a file transfer application that may request services from a file server.

The phrase "routable address," as used herein, generally refers to any communications endpoint on a computing system that identifies a service on the computing system. In some embodiments, a routable address may include an application port. For example, port 25 may be a routable address for simple mail transfer protocol traffic directed at a mail server. In some examples, a routable address may include an Internet Protocol (IP) address in a private address space. For example, a routable address may include an IPv4 and/or IPv6 private address.

In some examples, systems described herein may configure the service provided by the host to not be bound to any routable address on the local network. For example, the service provided by the host may be bound to a loopback address (e.g., "localhost" and/or 127.0.0.1). In some embodiments, systems described herein may configure the service to be accessible via a proxy instead of an application port. For example, a mail service that would normally be accessible on the local network via port 25 may instead only be accessible via a proxy on the host.

The term "messages," as used herein, generally refers to any communication between two computing systems on a network via any type of messaging protocol. In some embodiments, messages may be packets sent between a client and a host on a local network via transmission control protocol over Internet protocol. In some examples, messages may be a single sequence of packets. Additionally or alternatively, the messages may include all packets sent between the client and the host during a session. In some embodiments, messages may include application-layer communication such as hypertext transfer protocol messages, Internet relay chat messages, and/or file transfer protocol messages.

Identification module 104 may identify the local network in a variety of ways and contexts. In some examples, identification module 104 may identify the local network by executing on a computing system within the local network. In some examples, identification module 104 may operate as a part of an application and/or script that configures the network. In some embodiments, identification module 104 may identify a local network that connects servers in a data center. For example, identification module 104 may identify a local network that is in the process of being provisioned with a file server and/or a mail server.

At step 304 one or more of the systems described herein may provision the client with a proxy that intercepts the messages directed to the service by the client, identifies the host that provides the service based on determining that the messages are directed to the service, and adds at least one layer of encryption to the messages. For example, at step 304 provisioning module 106 may, as part of computing device 202 in FIG. 2, provision client 208 with proxy 216 that intercepts messages 214 directed to service 212 by client 208, identifies host 206 that provides service 212 based on determining that messages 214 are directed to service 212, and adds at least one layer of encryption 218 to messages 214.

The term "proxy," as used herein, generally refers to any computing system that may act as an intermediary for another computing system. In some embodiments, a proxy may be used to route messages from a client system to a host. Additionally or alternatively, multiple proxies may be used to route messages between multiple hosts. In some embodiments, a proxy may be located on a host system to route requests from client systems to a service provided by the host.

Provisioning module 106 may provision the client with the proxy in a variety of ways and contexts. In one example, provisioning module 106 may provision a client system with a proxy that is already configured to route messages from the client to the service. In other examples, provisioning module 106 may provision a client system with a proxy and then configure the proxy on the client system. In some examples, the proxy may be configured to route messages between the client and multiple services.

In one embodiment, the proxy may determine that the messages are directed to the service based on a token attached to the messages that identifies the service and the location of the host. In one example, the token may include a secret key that may identify a location of the host and/or the service provided by that host. In this example, the service may not be accessible without the secret key. In some examples, systems described herein may include providing the token that identifies the service to the client via an out-of-band process. For example, an administrator may provision the client with the token while setting up the network. In some embodiments, the token may be held at the client. In other embodiments, the token may be held at the proxy. In some embodiments, a single proxy may hold tokens identifying multiple services.

In some embodiments, the proxy on the client may communicate with one or more proxies on other computing systems. For example, the proxy on the client may send messages to a proxy on a host that is also functioning as an onion routing node.

In one embodiment, provisioning module 106 may provision the client with several application-specific proxies. For example, provisioning module 106 may provision the client with an email proxy that routes messages from an email application, a chat proxy that routes messages from a chat application, and/or a database proxy that routes messages from a database query application. Additionally or alternatively, provisioning module 106 may provision the client with a proxy that routes messages from multiple applications. For example, a single proxy may route messages for an email application, a chat application, a file transfer application, and/or a database query application.

In some embodiments, the proxy may intercept messages from the client. In other embodiments, provisioning module 106 may configure the client to send messages via the proxy. For example, provisioning module 106 may configure an email application to send messages via the proxy rather than via an email server.

At step 306 one or more of the systems described herein may configure the proxy to route the messages from the proxy to the host through an onion routing network within the local network that may include at least one onion routing node. For example, at step 306 proxy configuration module 108 may, as part of computing device 202 in FIG. 2, configure proxy 216 to route messages 214 from proxy 216 to host 206 through onion routing network 220 within local network 204 that may include at least one onion routing node 222.

The phrase "onion routing network," as used herein, generally refers to any collection of onion routing nodes on a network. The phrase "onion routing node," as used herein, generally refers to any computing system that may be configured to remove a layer of encryption from a message before forwarding the message. In some embodiments, an onion routing network may include only a single onion routing node. In other embodiments, an onion routing network may contain many onion routing nodes. In some embodiments, an onion routing network may select a set of nodes to route a message through and add one layer of encryption to the message for each of the nodes in the set. In these embodiments, each node may remove a single layer of encryption and/or uncover routing instructions to the next node in the set. In this way, the intermediary nodes may not be aware of the origin, destination, or contents of the message. This may prevent an attacker that has compromised a single intermediary node from making determinations about the message.

Proxy configuration module 108 may configure the proxy in a variety of ways and contexts. For example, proxy configuration module 108 may configure the proxy to intercept messages from the host, encrypt the messages in at least one layer of encryption, and/or route the messages to an onion routing network.

In some examples, proxy configuration module 108 may configure the proxy to redirect the messages from the client from an application port to an additional proxy. For example, the client may direct a message at a mail server via port 25. In this example, proxy may intercept the message to the mail server and redirect the message to a proxy on an onion routing node.

At step 308 one or more of the systems described herein may configure the onion routing network to remove the at least one layer of encryption from the messages before forwarding the messages toward the host via the local network. For example, at step 308 routing configuration module 110 may, as part of computing device 202 in FIG. 2, configure onion routing network 220 to remove the at least one layer of encryption 218 from messages 214 before forwarding messages 214 toward host 206 via local network 204.

Routing configuration module 110 may configure the onion routing network in a variety of ways. For example, routing configuration module 110 may configure the onion routing network to arbitrarily select a set of onion routing nodes for each session and add as many layers of encryption to the original message as there are nodes in the set, then have each node remove a single layer of encryption before forwarding the message.

In some examples, systems described herein may configure the local network to expose a single port that is bound to an additional proxy that routes to a plurality of services. For example, systems described herein may configure the local network to expose a port that is not normally associated with a specific service, and redirect all requests for services through a socket secure proxy bound to that port. In one example, a proxy may be bound to port 81 and may route requests for a mail server, a file server, and/or a database server through the proxy to the hosts of the respective services rather than accepting requests for the services at ports 25, 20 and/or 1433, respectively.

Figure 4:
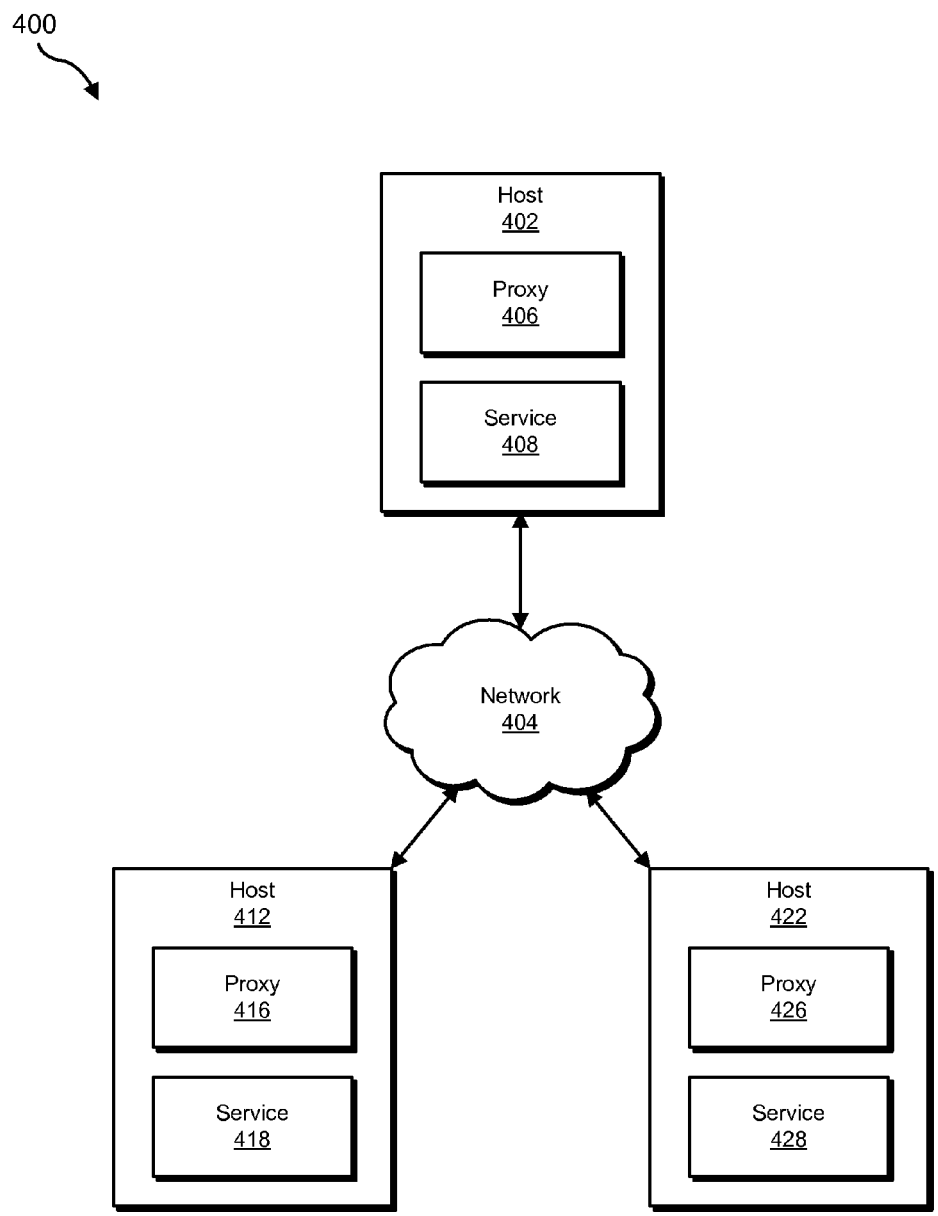
FIG. 4 is a block diagram of an exemplary computing system for obscuring network services.

In some embodiments, the proxy may include a plurality of proxies provisioned to a plurality of hosts. In some examples, systems described herein may configure the host to function as an additional proxy that routes additional messages from at least one additional host. FIG. 4 is a block diagram of an exemplary computing system 400 for obscuring network services by configuring each host to also act as a proxy.

As illustrated in FIG. 4, hosts 402, 412 and/or 422 may be connected via network 404. Host 402 may include proxy 406 and/or may provide service 408. Host 412 may include proxy 416 and/or may provide service 418. Host 422 may include proxy 426 and/or may provide service 428. Any or all of proxies 406, 416 and/or 426 may function as onion routing nodes and/or may route messages to any or all of hosts 402, 412 and/or 422. For example, a message from a client to service 408 on host 402 may be routed through proxy 416 on host 412.

By configuring all hosts with proxies, configuring hosts not to display information that differentiates them from other hosts, and routing traffic to any host through any other host or hosts, all hosts on the local network may appear to a network scan to be identical. For example, service 408 may include a mail service. A client may send a message to the mail service that may be routed through proxy 416 and/or 426 that may function as an onion routing node and/or may remove a layer of encryption. Because the message passes between multiple hosts and changes appearance every time it is forwarded, an attacker may be unable to discern that the message is bound for a mail service hosted on host 402 and therefore may be unable to determine that host 402 includes a mail server. In addition, because all of the hosts may accept traffic directed to the same port, an attacker using a network scanning service such as NMAP may not be able to determine which host provides which service.

Figure 5:
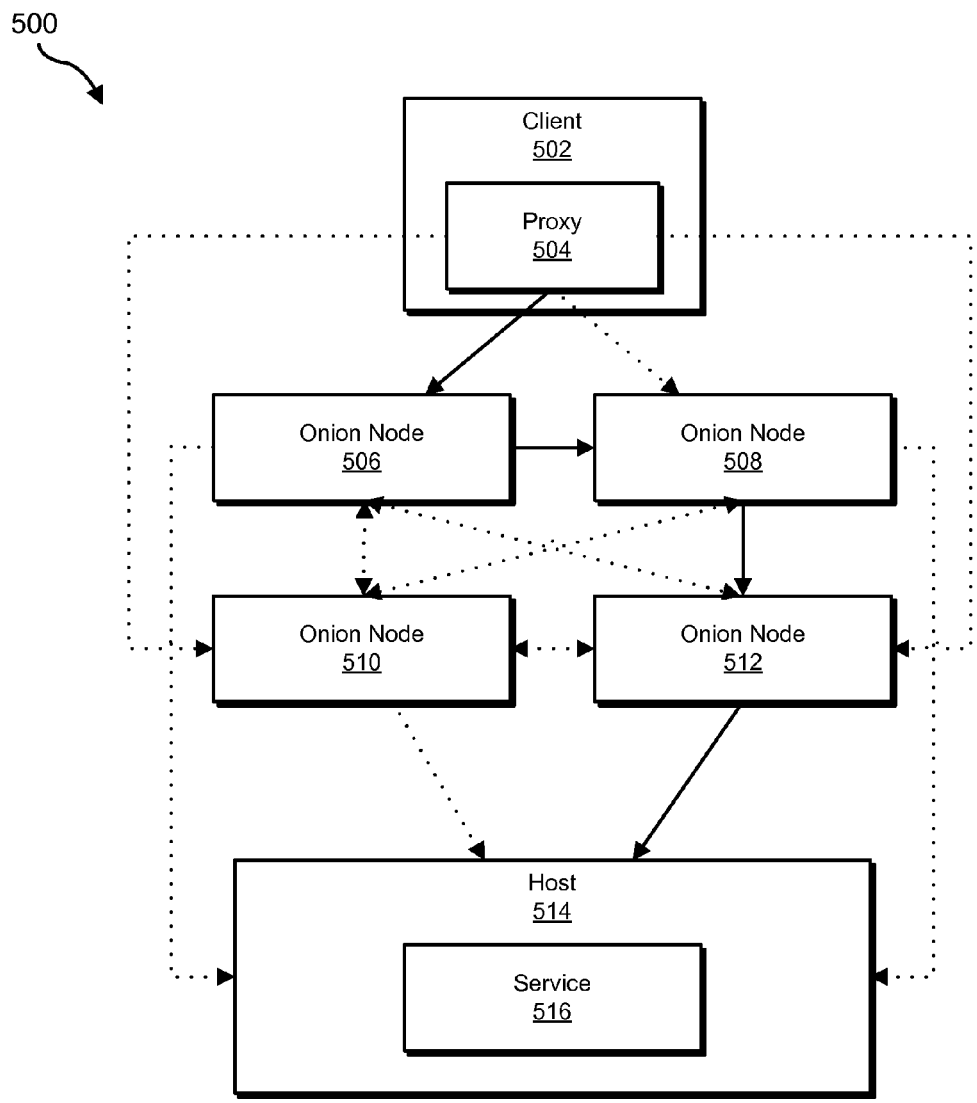
FIG. 5 is a block diagram of an exemplary computing system for obscuring network services.

In some embodiments, multiple servers on the network may be configured into onion routing nodes. FIG. 5 is a block diagram of an exemplary computing system 500 for obscuring network services using an onion routing network. As illustrated in FIG. 5, a client 502 may include a proxy 504 that may communicate with any or all of onion nodes 506, 508, 510 and/or 512, that may in turn communicate with a host 514 that may include a service 516.

In some examples, routing configuration module 110 may configure the onion routing network to route messages from the client to the host via a plurality of sets of onion routing nodes that are selected from the onion routing network each session. For example, as illustrated in FIG. 5, messages may be sent from proxy 504 to onion node 506, then to onion node 508, on to onion node 512 and finally to host 514. In some examples, any message sent between proxy 504 and host 514 during a particular session may be sent along this route. During other sessions, messages between proxy 504 and host 514 may be sent via any route through the onion routing network. For example, messages may be sent from proxy 504 to onion node 508 and then to host 514. In another example, messages may be sent from proxy 504 to onion node 510, then to onion node 506, then to host 514. Messages may be routed through any combination of onion routing nodes.

In one embodiment, the onion routing network may remove the at least one layer of encryption from the messages by removing a single layer of encryption at each onion routing node. For example, a message may be sent by proxy 504 with three layers of encryption. Onion node 506 may remove a layer of encryption and may uncover routing instructions to route the message to onion node 508. Onion node 508 may remove a second layer of encryption and uncover routing instructions to onion node 512. Onion node 512 may remove the third layer of encryption and may route the message to host 514. Removing layers of encryption and routing messages in this way may make it very difficult for a malicious actor to trace messages through the network.

An additional benefit of onion routing is that any given node may not know the origin and/or destination of messages passing through the node. For example, onion node 512 may forward a message from onion node 508 to onion node 510. In this example, onion node 512 has no information to indicate that the message originated at proxy 504 or that the message's ultimate destination is host 514. Host 514 may also not have the information that the message originated from proxy 504 and/or proxy 504 may not have the information that the endpoint for the message is host 514. Because the endpoint of the message may be obscured from the client and from most of the onion routing nodes, an attacker may not be able to easily determine the host of a particular service even if the attacker has compromised a client or node within the network.

As explained above in connection with method 300 in FIG. 3, systems described herein may configure a local network to route all requests for specific services from at least one client to at least one host via a proxy. In some embodiments, the proxy may route requests through and/or be part of an onion routing network.

In some examples, computing systems that host services may also function as onion routing nodes, causing the hosts on the network to be indistinguishable from one another from the point of view of a network scan. This may increase the difficulty for potential attackers by preventing attackers that have already infiltrated the network from determining which systems host which services.

In some embodiments, the local network may also be configured to route all requests for services through a single port. In addition, individual hosts may also be configured to route requests for services through a non-service specific port. By eschewing the use of normal service ports, systems described herein may prevent attackers from determining which systems host which services by monitoring the ports through which traffic to those systems is routed. Attackers that have infiltrated a network may run a port scan to determine which systems are hosting which services, but because services may be bound to a loopback address and/or proxies instead of the expected ports, a network scan may not reveal which systems host which services and/or which protocols are being used for services. In addition, because hosts may be configured to appear identical, a network scan may not reveal additional valuable information about hosts such as operating system and/or software version. This may make it more difficult for attackers to focus their efforts on more valuable and/or vulnerable targets. By making it more difficult for attackers to determine the hosts for services, systems described herein may increase the security of local networks and of the organizations which use them.

Figure 6:
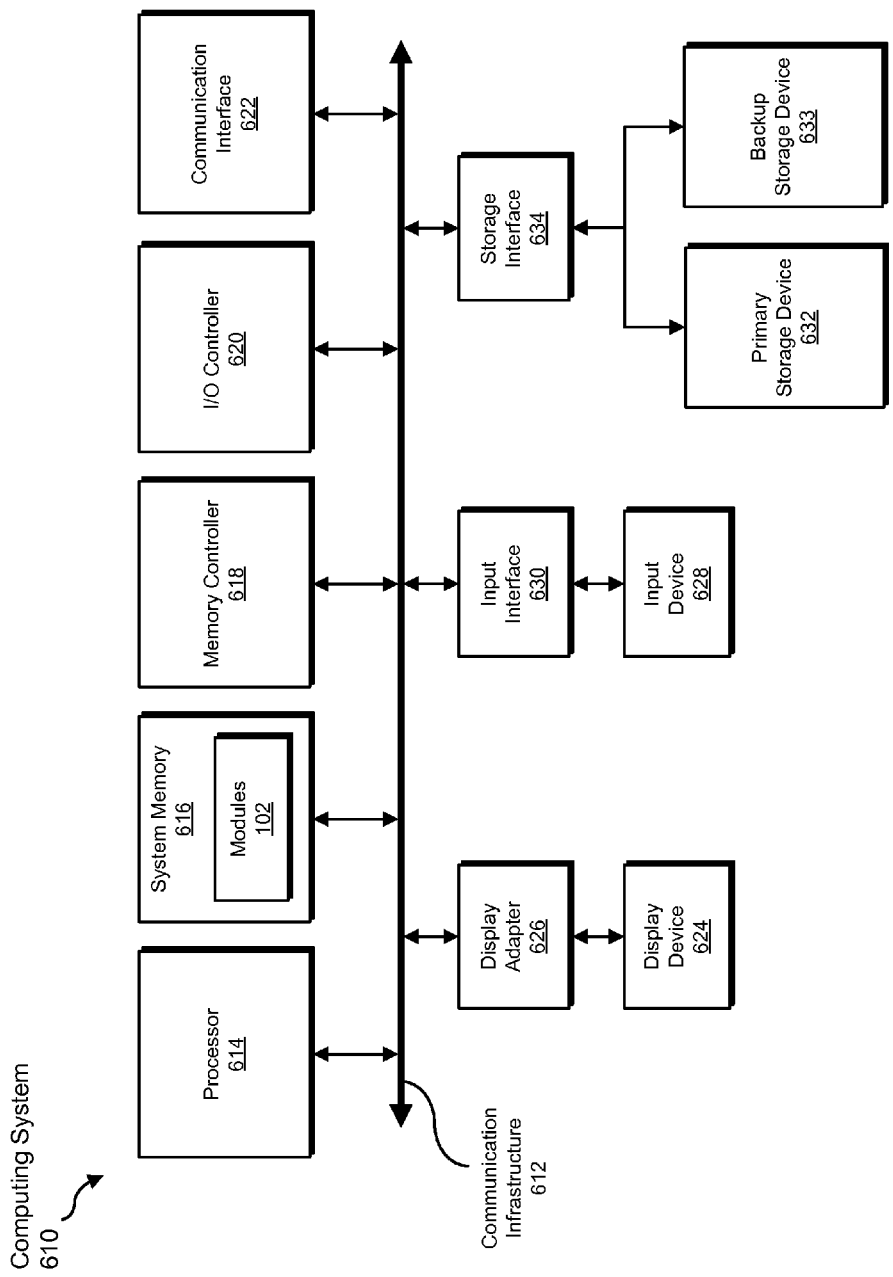
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
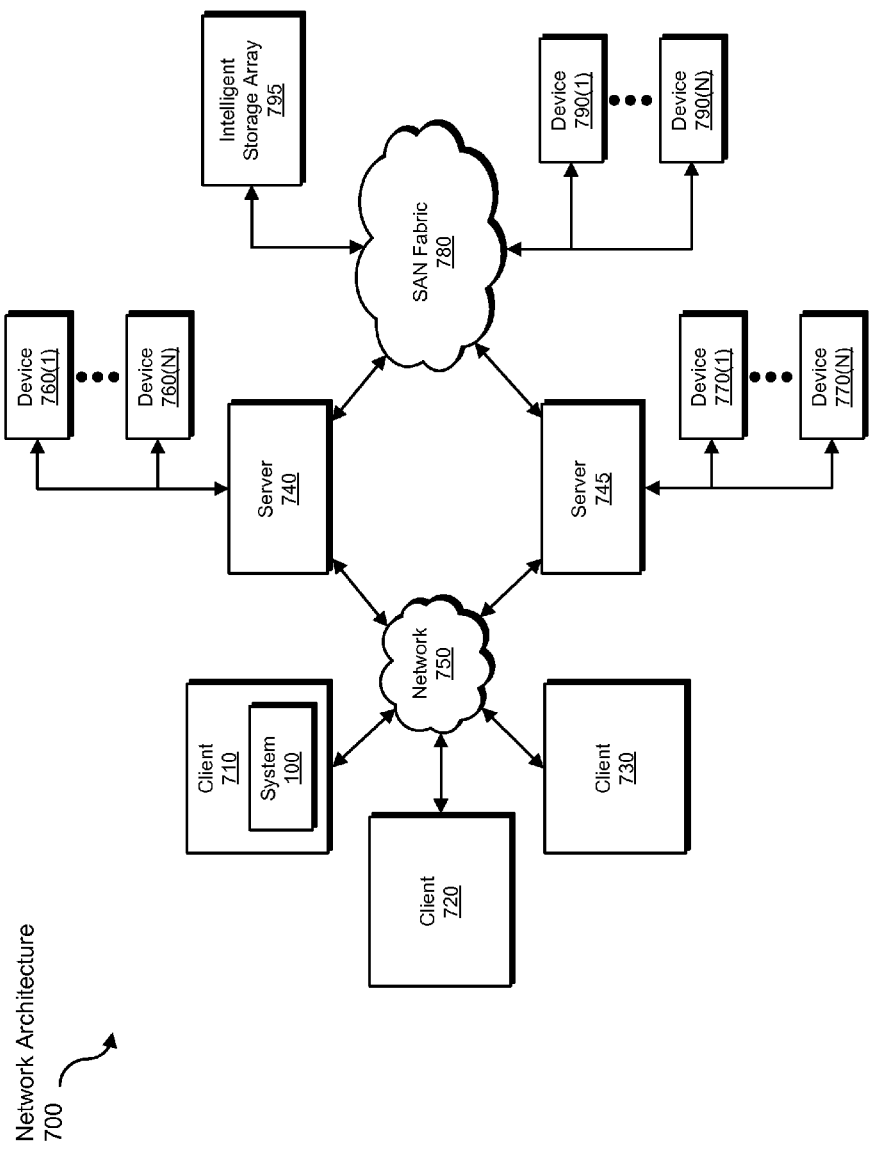
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for obscuring network services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive messages to be transformed, transform the messages, output a result of the transformation to a proxy, use the result of the transformation to access services, and store the result of the transformation to a client. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for obscuring network services, at least a portion of the method being performed by a computing device comprising at least one processor, the method comprising:
    identifying a local area network comprising a client and a host, where the host provides a service that is not bound to any routable address on the local area network and the client is configured to send messages to the service;
    provisioning the client with a proxy that:
        intercepts the messages directed to the service by the client;
        identifies the host that provides the service out of a plurality of hosts within the local area network based on determining that the messages are directed to the service; and
        adds at least one layer of encryption to the messages;
    configuring the proxy to route the messages from the proxy to the host through an onion routing network within the local area network that comprises at least one onion routing node; and
    configuring the onion routing network to remove the at least one layer of encryption from the messages before forwarding the messages toward the host via the local area network.

2. The computer-implemented method of claim 1, further comprising configuring the service provided by the host to not be bound to any routable address on the local area network.

3. The computer-implemented method of claim 1, wherein the proxy determines that the messages are directed to the service based on a token attached to the messages that identifies the service and the location of the host.

4. The computer-implemented method of claim 3, further comprising providing, to the client via an out-of-band process, the token that identifies the service.

5. The computer-implemented method of claim 1, further comprising configuring the local area network to expose a single port that is bound to an additional proxy that routes to a plurality of services.

6. The computer-implemented method of claim 1, further comprising configuring the host to not provide information that differentiates the host from at least one additional host on the local area network in response to a network scan.

7. The computer-implemented method of claim 1, wherein the service comprises at least one of:
    a mail service;
    a file service; and
    a database service.

8. The computer-implemented method of claim 1, wherein the onion routing network removes the at least one layer of encryption from the messages by removing a single layer of encryption at each onion routing node.

9. The computer-implemented method of claim 1, further comprising configuring the onion routing network to route messages from the client to the host via a plurality of sets of onion routing nodes that are selected from the onion routing network for a session.

10. The computer-implemented method of claim 1, further comprising configuring the host to function as an additional proxy that routes additional messages from at least one additional host.

11. The computer-implemented method of claim 1, wherein the proxy comprises a plurality of proxies provisioned to a plurality of clients.

12. The computer-implemented method of claim 1, further comprising configuring the proxy to redirect the messages from the client from an application port to an additional proxy.

13. A system for obscuring network services, the system comprising:
    an identification module, stored in memory, that identifies a local area network comprising at least one client and at least one host, where the host provides a service that is not bound to any routable address on the local area network and the client is expected to send messages to the service;
    a provisioning module, stored in memory, that provisions the client with a proxy that:

intercepts the messages directed to the service by the client;

identifies the host that provides the service out of a plurality of hosts within the local area network based on determining that the messages are directed to the service; and adds at least one layer of encryption to the messages;

a proxy configuration module, stored in memory, that configures the proxy to route the messages from the proxy to the host through an onion routing network within the local area network that comprises at least one onion routing node;

a routing configuration module, stored in memory, that configures the onion routing network to remove the at least one layer of encryption from the messages before forwarding the messages toward the host via the local area network; and at least one physical processor configured to execute the identification module, the provisioning module, the proxy configuration module and the routing configuration module.

14. The system of claim 13, further comprising a network configuration module, stored in memory, that configures the service provided by the host to not be bound to any routable address on the local area network.

15. The system of claim 13, wherein the proxy determines that the messages are directed to the service based on a token attached to the messages that identifies the service and the location of the host.

16. The system of claim 15, further comprising a providing module, stored in memory, that provides, to the client via an out-of-band process, the token that identifies the service.

17. The system of claim 13, further comprising a network configuration module, stored in memory, that configures the local area network to expose a single port that is bound to an additional proxy that routes to a plurality of services.

18. The system of claim 13, wherein the provisioning module configures the host to not provide information that differentiates the host from at least one additional host on the local area network in response to a network scan.

19. The system of claim 13, wherein the service comprises at least one of:
 a mail service;
 a file service; and
 a database service.

20. A non-transitory computer-readable medium comprising one or more computer-readable instructions that, when executed by at least one processor of a computing device, cause the computing device to:

identify a local area network comprising at least one client and at least one host, where the host provides a service that is not bound to any routable address on the local area network and the client is expected to send messages to the service;

provision the client with a proxy that:
 intercepts the messages directed to the service by the client;
 identifies the host that provides the service out of a plurality of hosts within the local area network based on determining that the messages are directed to the service; and
 adds at least one layer of encryption to the messages;

configure the proxy to route the messages from the proxy to the host through an onion routing network within the local area network that comprises at least one onion routing node; and configure the onion routing network to remove the at least one layer of encryption from the messages before forwarding the messages toward the host via the local area network.

* * * * *